July 26, 1932.　　　　H. W. TOBEY　　　　1,869,328
WELDING TORCH
Filed May 27, 1931
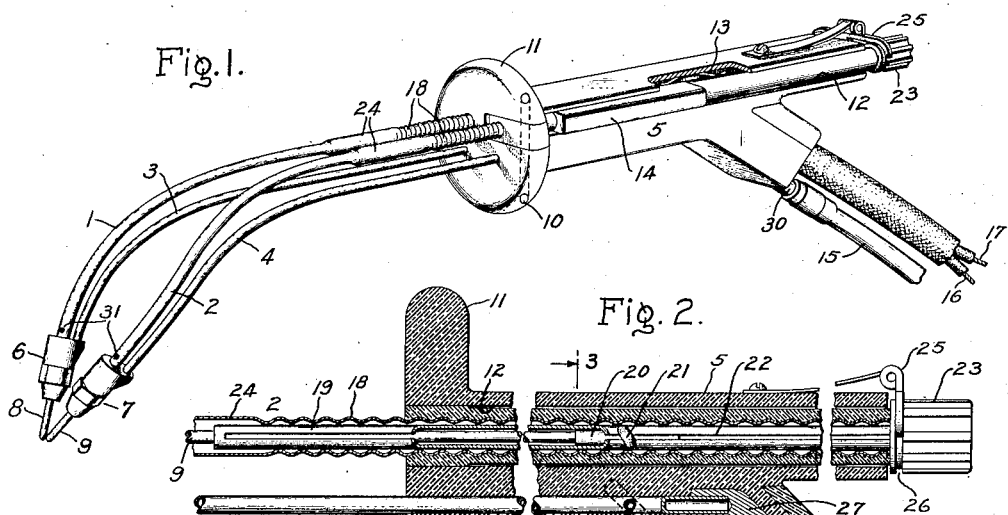
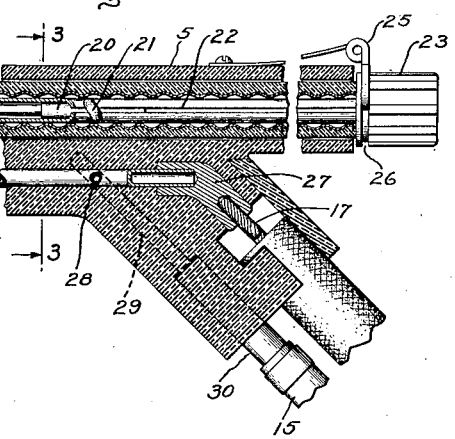
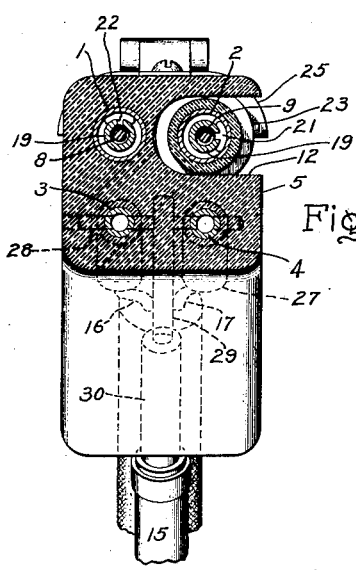
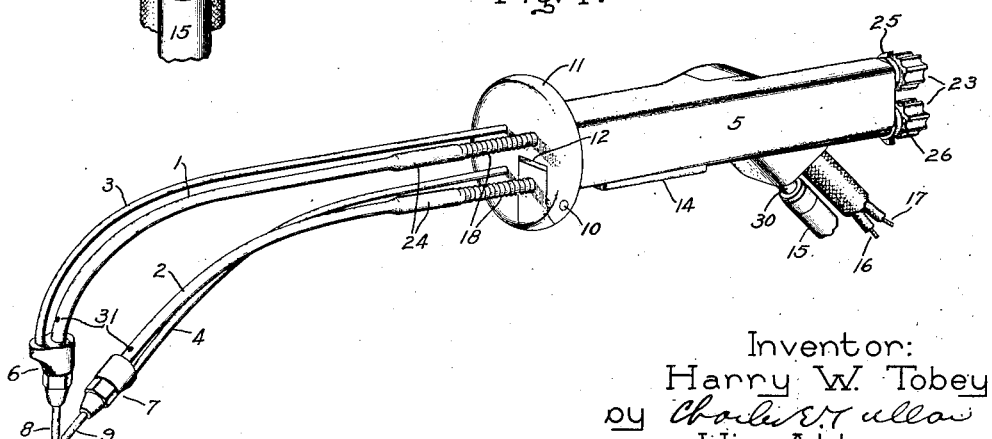
Inventor:
Harry W. Tobey
by Charles E. Mullan
His Attorney Patented July 26, 1932

1,869,328

UNITED STATES PATENT OFFICE

HARRY W. TOBEY, OF PITTSFIELD, MASSACHUSETTS, ASSIGNOR TO GENERAL ELECTRIC COMPANY, A CORPORATION OF NEW YORK

WELDING TORCH

Application filed May 27, 1931. Serial No. 540,394.

My invention relates to welding, and more particularly to an improved welding torch for gas-arc welding. In gas-arc welding the welding operation is performed through the agency of an electric arc and a gaseous medium supplied to and about the arc.

My invention is particularly applicable to the utilization of the heating effects of flames of atomic hydrogen. An atomic hydrogen flame may be produced by dissociating hydrogen through the agency of an electric arc and then allowing the dissociated hydrogen to recombine or "burn". Upon recombination the atomic hydrogen liberates an enormous amount of heat which may be used for welding or like operations. The utilization of such atomic hydrogen flames is disclosed and claimed broadly in the copending application of Irving Langmuir, Serial No. 729,185, filed July 30, 1924, for heating process and apparatus, which application is assigned to the same assignee as the present application. While my invention is well suited for atomic hydrogen flame welding, many of the features of construction thereof are of general application to the type of welding apparatus wherein an arc is maintained between a plurality of electrodes supported adjacent the work, and is especially applicable to such types of welding apparatus wherein a welding medium of any suitable character is supplied to and about the arc and the work being welded.

It is an object of my invention to provide a balanced, light-weight gas-arc torch in which the parts are so related to one another that it is possible to use the torch effectively in all kinds of welding and, particularly, for welding in confined or restricted places.

My invention will be better understood from the following description taken in connection with the accompanying drawing in which Fig. 1 is a perspective view of a torch embodying my invention; Fig. 2 is a sectional view, taken lengthwise of the handle of the torch of Fig. 1, showing the construction of the feeding mechanism and the gas and electrical connections in the handle of the torch; Fig. 3 is a sectional view of the handle portions of the torch of Figs. 1 and 2 taken along the lines 3—3 of Fig. 2, and Fig. 4 is a perspective view of another torch embodying my invention.

The torch shown in Fig. 1 comprises a plurality of electrode tubes 1, 2 and a plurality of gas tubes 3, 4 having downwardly and inwardly curved portions projecting beyond a handle 5 and terminating in nozzle members 6 and 7. Flexible electrodes 8 and 9 are fed through these electrode tubes and nozzles into arcing engagement with one another by means of feeding mechanisms enclosed partly or wholly within the handle of the torch. In the particular torch illustrated the electrode tube 1 and the gas tubes 3 and 4 are supported in and extend longitudinally through the handle 5. Electrode tube 2, however, is pivotally supported at 10 in the guard 11 of the handle 5 so that that portion of the tube corresponding to the portion of the tube 1 enclosed within the handle 5 is located in a groove 12 extending longitudinally of the handle. The tubes are biased relatively to one another to a predetermined position by a spring 13 located in this groove. The pivoted tube may be moved against the action of this spring by a hand-piece 14. In the arrangement illustrated the hand-piece 14 is attached to that portion of the pivoted tube extending through the groove and extends from the groove a sufficient distance to enable the operator by exerting pressure thereon to move the tube into the groove against the action of the spring and to cause nozzle 7 and electrode 9 to be moved away from nozzle 6 and electrode 8 toward which they are normally biased by means of spring 13. Gas is supplied to the gas tubes 3 and 4 through handle 5 by a hose or like conduit 15, and electricity is supplied to each of these tubes by conductors 16 and 17. The gas thus supplied is discharged through nozzles 6 and 7 about the electrodes 8 and 9, which are connected through these nozzle members, the gas tubes 3 and 4, and the electrical conductors 16 and 17 to a source of supply (not shown) suitable for maintaining an arc between the electrodes during the welding operation. Handle 5 and hand-piece 14 are preferably made of electrical insulating material although other means may be employed for insulating the electrode tubes and gas tubes from one another and for protecting the operator from shock. That portion of tube 2 in slot 12 of the handle is also electrically insulated to protect the operator from shock. In the torch shown in the drawing the feeding mechanism is located in the electrode tubes. These tubes are provided with internally threaded portions 18 within which are enclosed hollow sleeve members 19 into which the electrodes extend, and from which they are propelled by members 20 having threaded portions 21 extending through keyways 22 in sleeves 19 into engagement with the threads of the tube 18. The sleeves 19 are rotatable relatively to the tubes 18 and are provided at their terminals with knobs 23 by means of which this rotation may be effected. The knobs are preferably made of electrically insulating material although other means may be employed for insulating them. When sleeves 19 are rotated by turning knobs 23, members 20 are propelled along the sleeves by reason of the engagement of their threaded portions 21 with the threaded portions 18 of the electrode tubes. It will be noted, however, that the electrode tubes are provided with enlarged portions 24 into which the terminal portions of the sleeves 19 project, and that when the threaded portions of the members 20 are propelled into these enlarged portions of the tube further feeding of the electrodes is prevented. By employing this construction it is impossible to jam the feeding mechanism, since the threaded portions 21 of the members 20 when fed into these enlarged portions will merely rotate idly therein. In order to prevent sleeves 19 from being accidentally withdrawn from the electrode tubes, the knobs 23 are held in place by a spring clip 25. The latch portion of the clip illustrated extends into circumferential grooves 26 in the knobs 23, thus permitting the knobs to be turned for feeding the electrodes while at the same time holding them securely in place relatively to the handle 5.

The manner in which the gas and electricity are supplied to the gas tubes 3 and 4 is likewise shown in the sectional views of Figs. 2 and 3. As illustrated in these figures, these tubes extend into handle 5 and are insulated from one another by the material of the handle. The ends of the tubes are closed by caps 27 which provide terminals for the conductors 16 and 17. The tubes are connected to a supply of gas through interconnecting passageways 28 and 29 located in the handle. Passageway 28 extends between the tubes and passageway 29 connects it to the tube 30 to which is attached the hose 15 previously referred to. By resorting to this construction the gas tubes are electrically insulated from one another and from tube 30. This arrangement of parts is described and claimed in Letters Patent No. 1,808,541, Robert T. Gillette and Edward S. Webster, dated June 2, 1931, and forms no part of my invention.

Each of the electrode tubes is provided with vent holes 31 for preventing gas supplied through nozzles 6 and 7 from flowing back through these tubes into or through the feeding mechanism. If the gas is corrosive in character, it will impair or destroy the feeding mechanism and, if it is inflammable, it may become ignited and burn with a small flame directly under the operator's hand. The vent holes 31 prevent both of these occurrences. They should be made large enough to carry away any gas leaking back through the nozzles 6 and 7 into the electrode tubes. Preferably these vents are located near the nozzles.

In Fig. 1 the electrode tubes have a horizontal position relative to one another. The tubes may, however, be located in any desired position and more than two tubes may be used since the invention is not limited to direct current welding, or single phase alternating current welding. In multiphase alternating current welding three or more electrode tubes will be employed, and the construction of the torch modified accordingly. In Fig. 4 I have illustrated a torch in which the feed tubes and electrode tubes are located in a vertical plane relative to one another. A torch of this construction will for certain classes of work have advantages over a torch constructed as illustrated in Fig. 1 in which the electrode tubes and gas tubes are located in a horizontal position relative to one another. Except for the modifications resulting from the different location of the electrode tubes and gas tubes relative to one another the construction of the torch shown in Fig. 4 is the same as that shown in Figs. 1, 2 and 3. In Fig. 4 the same reference numbers used in Figs. 1, 2 and 3 have been employed to identify like parts.

The feeding mechanism and the pivotal support of one electrode tube relative to another above described are the inventions of Harold V. May and are described and claimed in his copending application, Serial No. 540,393 filed concurrently herewith, for a welding torch, and assigned to the same assignee as the present application.

Although the torches illustrated and described above have a particular utility when used in atomic hydrogen welding, they are not limited to this particular form of gas-arc welding. Modifications of my invention will occur to those skilled in the art in view of the arrangements above described, and I therefore aim in the appended claims to cover all such modifications as fall within the true spirit and scope of my invention, as set forth in the appended claims.

What I claim as new and desire to secure by Letters Patent of the United States, is:

1. An arc welding torch comprising a handle, a plurality of electrode tubes having downward and inwardly curved portions projecting from said handle, means for feeding electrodes through each of said tubes into arcing engagement with one another, and means for connecting a source of electricity to each of said tubes.

2. An arc welding torch comprising a plurality of curved convergent electrode tubes, a handle for supporting and electrically insulating said tubes, means in that portion of said tubes in said handle for feeding electrodes through said tubes into arcing engagement with one another, and means for connecting a source of electricity to each of said tubes.

3. An arc welding torch comprising a handle, a plurality of electrode tubes having downwardly and inwardly curved portions projecting beyond said handle, nozzle members at the terminal portions of said tubes, means for connecting a source of electricity to each of said nozzles, means in said nozzles for discharging gas about electrodes fed through said nozzles, means supported in said handle and having a configuration corresponding to said electrode tubes for supplying gas to said nozzles, means in said handle for feeding electrodes through said tubes and said nozzles into arcing engagement with one another, and means for electrically insulating said electrode tubes and said gas supplying means.

4. An arc welding torch comprising a plurality of electrode tubes, nozzles at the corresponding ends of each of said tubes, means for feeding electrodes through said tubes and said nozzles, means for connecting a source of electricity to each of said nozzles, means for discharging gas through each of said nozzles about said electrodes, and a vent hole in each of said electrode tubes near said nozzles.

5. An arc welding torch comprising a handle, a plurality of electrode tubes supported in and projecting beyond said handle and terminating in nozzles, means for connecting a source of electricity to each of said nozzles, means for discharging gas through each of said nozzles about said electrodes, feeding mechanism in said handle connected to said electrode tubes, and a vent hole in each of said electrode tubes near said nozzles for preventing gas flowing back through said electrode tubes into or through said feeding mechanism.

In witness whereof, I have hereunto set my hand.

HARRY W. TOBEY.